Nov. 20, 1962 P. M. LUCAS ETAL 3,065,458

PATH TESTING EQUIPMENT FOR AN ELECTRONIC CONNECTION NETWORK EMPLOYING TERMINAL MARKING

Filed Oct. 28, 1959 5 Sheets-Sheet 1

INVENTORS
Pierre Marie Lucas
Michel Marcel Rouzier

BY C. A. Bullbrandsen
Atty.

INVENTORS
Pierre Marie Lucas
Michel Marcel Rouzier
BY C. A. Gulbrandsen
Atty.

Nov. 20, 1962 P. M. LUCAS ETAL 3,065,458

PATH TESTING EQUIPMENT FOR AN ELECTRONIC CONNECTION NETWORK EMPLOYING TERMINAL MARKING

Filed Oct. 28, 1959 5 Sheets-Sheet 3

INVENTORS
Pierre Marie Lucas
Michel Marcel Rouzier

BY C. A. Gulbrandsen

Atty.

Nov. 20, 1962 P. M. LUCAS ETAL 3,065,458

PATH TESTING EQUIPMENT FOR AN ELECTRONIC CONNECTION NETWORK EMPLOYING TERMINAL MARKING

Filed Oct. 28, 1959 5 Sheets-Sheet 4

INVENTORS
Pierre Marie Lucas
Michel Marcel Rouzier

BY C. A. Gulbrandsen
Atty.

INVENTORS
Pierre Marie Lucas
Michel Marcel Rauzier
BY C. A. Gulbrandsen
Atty.

United States Patent Office 3,065,458

Patented Nov. 20, 1962

3,065,458

PATH TESTING EQUIPMENT FOR AN ELECTRONIC CONNECTION NETWORK EMPLOYING TERMINAL MARKING

Pierre Marie Lucas, Issy-les-Moulineaux, and Michel Marcel Rouzier, Clichy-sur-Bois, France, assignors to Automatic Electric Laboratories, Inc., a corporation of Delaware Filed Oct. 28, 1959, Ser. No. 849,308
Claims priority, application France Oct. 31, 1958
5 Claims. (Cl. 340—166)

The present invention relates to improvements in a path testing system especially adapted to the case of complex networks employing terminal marking and intermediate selection.

The path testing devices of the prior art have, in general, the majority of their parts equipped with several stages of gas diodes.

For a connection operation, the determination of a path begins with a marking effected by means of "selector" tubes. This marking is propagated from the extremities toward the center of the network that makes the connection. It is relayed by appropriate devices called "propagators" which furnish a supplement to the current required for the said marking. At the center of the network are provided devices called "intermediate junctors" each including a "switching tube" which lights when on the one hand, the marking currents arrive simultaneously at the two extremities of the intermediate junctor, and, on the other hand, an appropriate distributor emits an impulse. The firing of the switching tube assures the establishment of the corresponding path.

For a disconnection operation, there is generally provided a special tube called a cutoff tube. The disconnect marking arrives from one side or the other, over the path previously chosen. The cutoff tube lights under the control of its cathode, and short-circuits the switching tube which is extinguished. At the end of the disconnect pulse applied to the cathode of the cutoff tube, the said tube is extinguished. The interruption of the path is then assured.

It is well known, that for the majority of the path testing devices of the prior art, the strength of the nominal marking current has in general, a relatively high value (0.5 milliampere for example). The large number of possible paths in such a network permitting the use of only a very weak test current for marking purposes at each intermediate unit, it is necessary to add propagators to furnish all of the current required for marking the complete "fan" comprising the gas tubes of the interconnection networks of the path testing devices.

It is likewise well known, that because of the length of their ionization time, gas tubes have relatively long operating times. Consequently, it is difficult, with path testing devices totally equipped with gas diodes, to obtain a very high speed sequential analysis of all of the intermediate junctors, since before passing from one intermediate junctor to the next, it is necessary to wait for an interval of time superior to the ionization time of the switching tube to be certain that it is not going to light.

The path testing device of the present invention, like the path testing devices of the prior art, utilizes the known principle of terminal marking, the recognition of the availability of a path by the intermediate equipments, control of the connection points (connection and disconnection) by these same intermediate equipments. However, the path testing device of the invention is distinguished from those of the prior art by the following improvements.

A first object of the invention is to obtain an operation of the sequential distribution to the intermediate equipments in a very short time (of the order of one microsecond), by constructing the latter with transistors and semi-conductor diodes. Also, the use of transistors and semi-conductor diodes avoids the introduction of non-standard parts, such as gas triodes and tetrodes. Only the connection points of the interconnection network of the path testing device of the invention may be gas diodes.

A second object of the invention is to permit the adaptation of the said path testing system to a very large network (10,000 paths for example) without necessitating supplementary devices at the interior of the said network to play the role of relaying the marking current, or systems for fractionizing the network. The said network is taken as is, and tested "in block" with a single marking impulse.

A third object of the invention is to permit operation with a low value of marking current by the employment of a system of coincidence gates including a condenser, and based on the principle of achieving a high gain in current by the rapid discharge of a condenser which has been charged clowly.

The nominal marking current, which is as previously stated approximately 0.5 milliampere in most of the path testing devices of the prior art, has thus an intensity of only 50 microamperes for the device of the invention. The propagators and the selector tubes utilized in the systems of the prior art are no longer necessary, and for this reason, are not present in the system of the invention.

Such a system of coincidence gates accommodates itself to test currents of a very low value and susceptible to considerable variations. In particular, the said coincidence system tolerates easily very large variations in the outputs of the gas diodes of the interconnection networks. These variations may be due on the one hand, to variations in the electrical characteristics of these low output gas diodes, and on the other hand, to the state of occupation of the connection network at the time of a marking.

A fourth object of the invention is to reduce the consumption of current at rest by employing in the path testing device an impulse distributing system where the terminal coincidence circuts are made with transistors which draw current only at the moment of coincidence. A similar impulse distributor may likewise be used in connection with the marking selectors.

A fifth object of the invention is that of knowing the state of the gas diodes without having to test them, by assuring that all of the control signals to the gas diodes of the interconnection network are assigned to a certain path by the trigger circuit of the intermediate equipment.

The features corresponding to the above mentioned objects, and other characteristics of the invention, will be more apparent from the detailed description which will now be undertaken with respect to a non-limiting form of the invention, and from an examination of the annexed drawings, in which.

Figure 6:
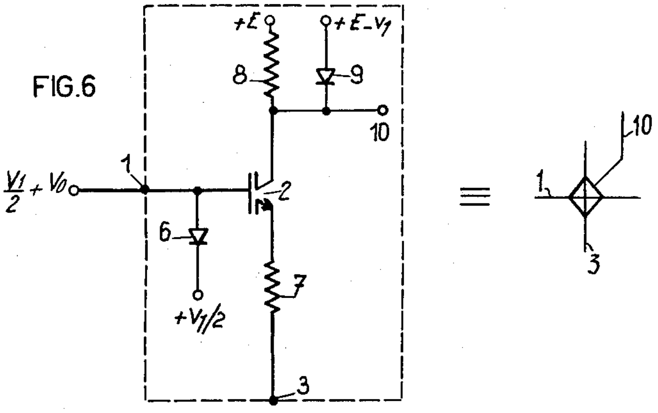
Figure 5:
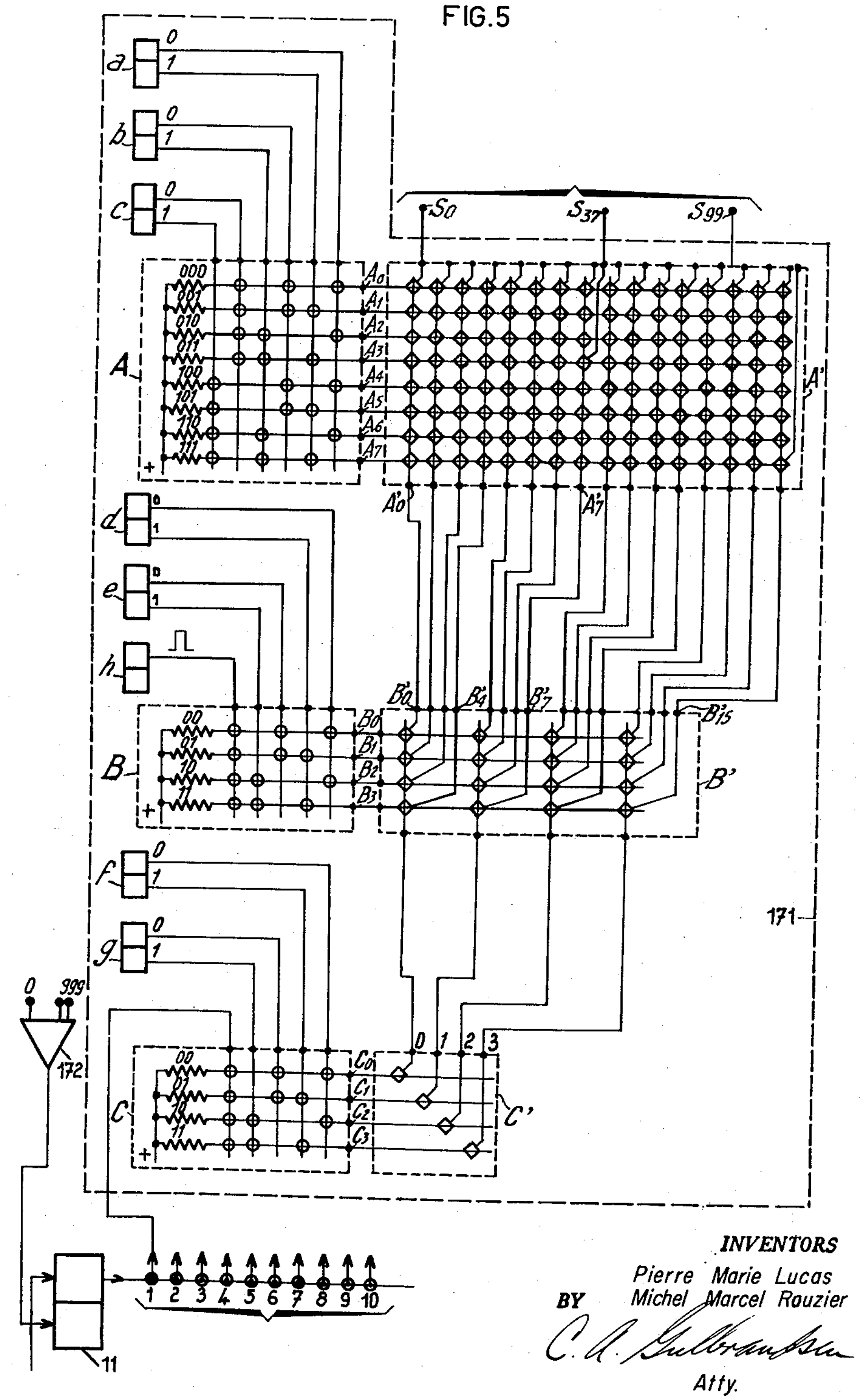
FIG. 5 represents a connection impulse distributor.

FIG. 6 gives the schematic of a transistor "and" gate used in the connection impulse distributor shown in FIG. 5.

The path testing equipment which is to be described hereinafter has been specially laid out to equip a connection network for an electronic switching telephone central office having one thousand lines $L_0$ to $L_{999}$, which may be subscribers' lines.

As has already been said, this equipment is taken as an example, and its description should not be considered as limitative. It is in fact possible to adjoin the path testing device of the invention, without modification, to all systems intended to search among a network of available paths for those which are free.

Figure 1:
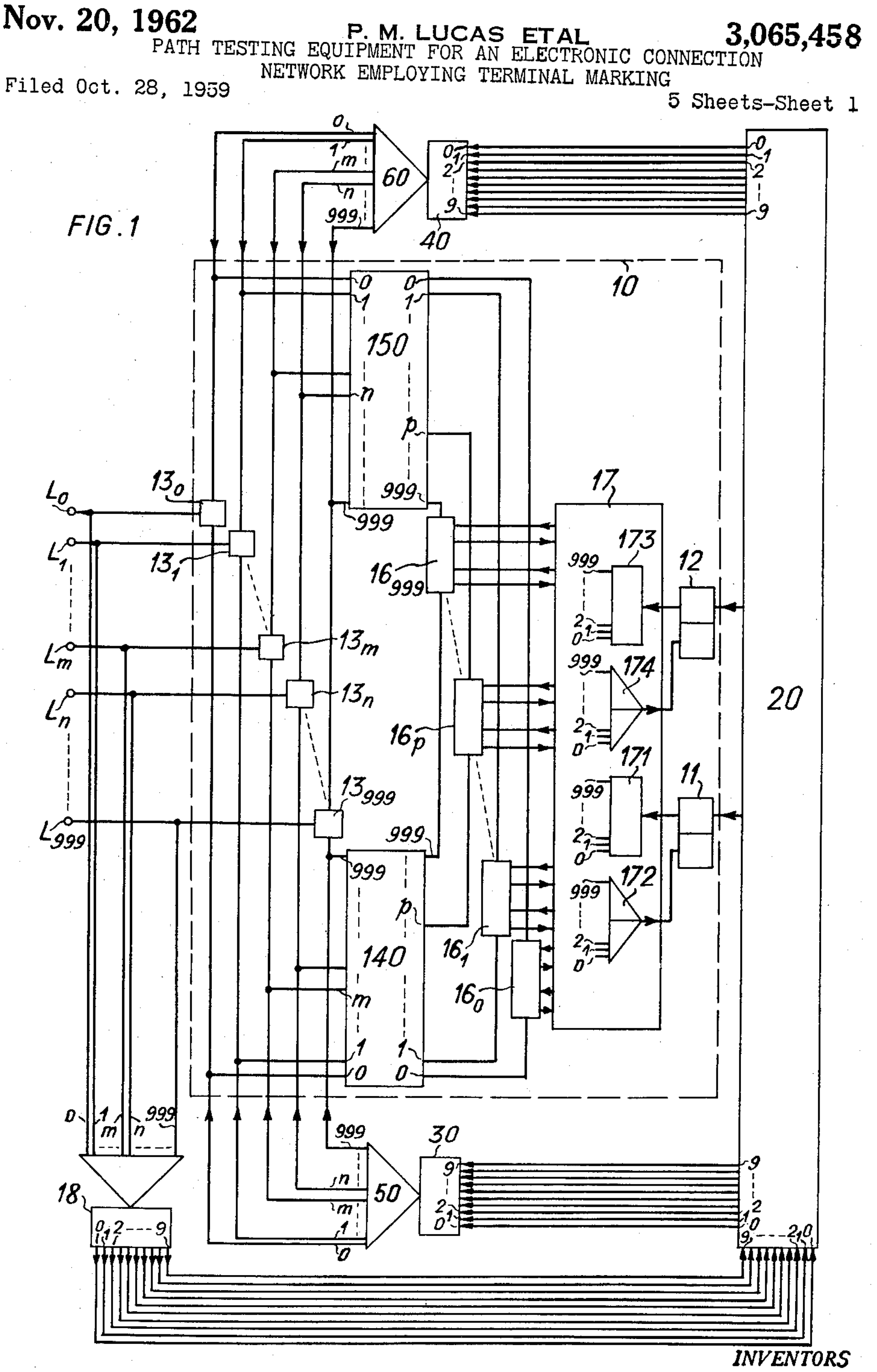
FIG. 1 represents the overall schematic layout of the path testing device of the invention.

In FIG. 1, the section 10 enclosed in broken lines constitutes the main part of the path testing device. It will be called the "connection network."

The operations which are to be effected by the said connection network 10 are two in number:

(*a*) An operation corresponding to a connection order and which consists in establishing an electrical connection between a line *m* of a calling subscriber and the line *n* of a called subscriber;

(*b*) An operation corresponding to a disconnection order and which consists in breaking a connection previously established between a line of known identity and another line whose identity does not need to be known.

The connection network 10 effects these operations under the control of a universal computer 20 which collects the necessary information (loop interruptions for example) from the telephone lines and circuits utilizing the path testing device, by means of a scanner 18.

Beginning with this information and its own program, the universal computer 20 determines the operations to be effected, and sends the corresponding orders to the connection network 10 on the basis of one order at a time, two successive orders being separated by a time interval of at least one millisecond.

As shown in FIG. 1, the thousand telephones lines $L_0$ to $L_{999}$ are each connected to the connection network 10 by means of the line circuits $\mathbf{13}_0$ to $\mathbf{13}_{999}$.

The line circuit $\mathbf{13}_m$ assigned to the line $L_m$ permits connecting the said line $L_m$ on the one hand to the input *m* of a one-thousand-inlet interconnecting network 140, and on the other hand to the input *m* of a second one-thousand-inlet interconnecting network 150.

The inlets to the interconnecting network 140 may be marked, that is to say, they may receive a marking impulse from a marking selector 50. In like manner, the inlets of the interconnecting network 150 may be marked by the marking selector 60. The markings for the two interconnecting networks 140 and 150 are independent of each other. The marking selector 50 marks the line *m* whose number has been recorded in the register 30 by the universal computer. In a similar manner, the marking selector 60 marks the line *n* whose number has been recorder in the register 40.

Figure 2:
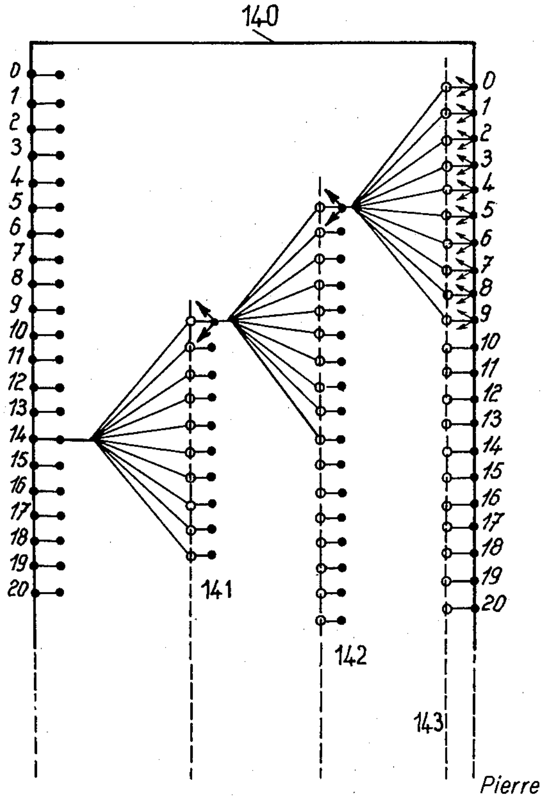
FIG. 2 is a partial schematic showing the arrangement of an interconnecting jumper network.

The construction of the interconnecting networks 140 and 150 is identical. FIG. 2 shows the arrangement for a three stage interconnection network; it shows how one of the inlets of the said network (inlet 14 for example) is jumpered to the thousand outlets of the same network. The inlet 14 is connected to a group of ten diodes 141 (gas diodes for example). Each of the diodes of this first stage 141 is connected to ten other diodes. The second stage 142 therefore includes one hundred diodes. Each of the diodes of the second stage is connected to ten new diodes. In this way, the final stage 143 includes one thousand diodes respectively connected to the thousand outlets (numbered 0 to 999) of the interconnection network considered.

Each of the inlets 0 to 999 of the interconnection network is connected in the same manner to the thousand outlets of this same network by a set of eleven hundred and ten diodes grouped in three stages in the manner just described.

In accordance with FIG. 2, it may be said that each inlet of the interconnection network is connected to the thousand outlets of the said network by means of a fan of a thousand branches. Each branch of the fan will be called a half-path, and it will be said that the said half-path will comprise three points of connection 141, 142, 143.

Practically, it is possible to utilize interconnection networks having a lesser number of gas diodes than the network described from FIG. 2; certain of the gas diodes of a same network may, in fact, be made common to several fans. With this simplified network, there are only a certain number of the diodes of the thousand branch fan which light when a marking impulse attacks the inlet *m* of the interconnection network. The gas diodes which do not light during a marking are those which are common to other fans already occupied by connections already established before the arrival of the marking impulse considered, at the inlet *m*. Otherwise stated, a marking impulse applied to the inlet *m* of an interconnection network causes the firing of all of the free half-paths.

As is shown in FIG. 1, the outlets 0 to 999 of the interconnection networks 140 and 150 are respectively connected to the intermediate equipments $\mathbf{16}_0$ to $\mathbf{16}_{999}$ which are connected with a group of associated equipment units 17. These are common to the thousand intermediate equipments.

The gas diodes 141, 142, 143 of the interconnection network 140, and 151, 152, 153 of the interconnection network 150, whose lighting connects together the branches of a "fan" used to form a half-path, may operate under three conditions of output: the "reduced" condition, the "normal" condition, and the "strong" condition.

As will be seen in detail subsequently, the reduced condition is essentially that of the half-paths whose inlet, such as *m* of the network 140, is subjected to a marking impulse, while those of the equipments $16_0$ to $16_{999}$ where they terminate are at rest.

The normal condition is that of the half-paths whose origin *m* is not receiving a marking impulse, and which terminate on an operated intermediate equipment unit $\mathbf{16}_p$.

The strong condition is that of the half-paths for which a marking impulse on their origin *m* coincides with an operated condition of the intermediate equipment unit $\mathbf{16}_p$ at which they terminate.

The roll of the intermediate equipment units $\mathbf{16}_0$ to $\mathbf{16}_{999}$ will now be specified.

In the first pace, it will be supposed that the connection network 10 effects a connection operation which consists in electrically connecting together the telephone lines $L_m$ and $L_n$, for example. To order this operation, the universal computer 20 sends simultaneously in the form of short impulses of a duration equal to one microsecond for example:

(*a*) The number *m* to the register 30;

(*b*) The number *n* to the register 40;

(*c*) A connection order to the trigger circuit 11, which is nothing other than a multivibrator of the bistable type.

The selector 50 assigned to the register 30 then sends a marking impulse to the inlet *m* of the interconnecting network 140.

The selector 60 assigned to the register 40 likewise sends a marking impulse to the inlet *n* of the interconnecting network 150.

The marking impulses are relatively long: one millisecond for example.

Th impulses emitted by the selectors 50 and 60 light respectively in the interconnection networks 140 and 150, the diodes corresponding to the free half-paths relative to the inlet *m* of the network 140 and to the inlet *n* of the network 150.

The half-paths whose diodes 141, 142, 143 and 151, 152, 153 light, terminate on intermediate equipments $\mathbf{16}_0$ to $\mathbf{16}_{999}$ which are waiting to be placed in service.

These intermediate equipments being at rest present a very high input impedance, and in consequence, oblige the gas diodes to operate under a condition of reduced output. But the trigger circuit 11 being in the working position, starts the associated device 171 called the connection impulse distributor, which sends successively to the intermediate equipments $\mathbf{16}_0$ to $\mathbf{16}_{999}$ a short impulse of a duration of one microsecond for example, and called a connection impulse.

If at an intermediate equipment unit there is coincidence of (*a*) the reduced current output of the gas diodes of a half-path terminating at the outlet *p* of the interconnection network 140, and (*b*) the reduced current output of the gas diodes of a half-path terminating at the outlet *p* of the interconnection network 150, when that intermediate equipment unit receives a connection impulse, it operates. This has for effect to return the trigger circuit 11 to the position of rest, by the intervention of the "and" gate 172, and in consequence, to stop the operation of the connection impulse distributor 171. Since the intermediate equipments to which this coincidence of currents coming from the interconnection networks 140 and 150 is presented are numerous and distributed randomly, it is not necessary to provide for the scanning of the thousand intermediate equipment units, but of only one or two hundreds, depending on the size contemplated for the network. The "or" gate 172 previously mentioned has a thousand inlets, each of which is assigned to one of the intermediate equipments $16_0$ to $16_{999}$.

From the fact of its operation, the equipment unit $16_p$ presents a very low input impedance. The two paths (*a*) input-*m*-outlet-*p* of the interconnection network 140 and (*b*) input-*n*-outlet-*p* of the interconnection network 150 pass simultaneously from the condition of reduced output to the condition of strong output. The result of this is that at the end of the marking impulses transmitted by the selectors 50 and 60, the diodes of the half-paths which have remained in the condition of reduced output are extinguished, while the diodes of the two chosen half-paths pass from the strong output to the normal output condition. The connection between the telephone line $L_m$ and the telephone line $L_n$ is now established through the intermediate equipment $16_p$.

It will now be assumed that the connection network 10 effects a disconnection operation, which operation will consist in rupturing an electrical connection previously established by an intermediate equipment $16_p$ between two telephone lines. As already stated, one of the telephone lines has a known identity: it will be assumed that this is the line $L_m$; as to the other line, its identity does not need to be known.

In the case of a disconnection, the universal computer 20 sends, in the form of simultaneous short impulses of a duration equal to one microsecond for example: (*a*) the number of the line $L_m$ either to the register 30 or the register 40, the register used being the one which served to establish the connection between the telephone line $L_m$ and the unknown line, which is in the example chosen to describe the disconnection operation, the register 30; and (*b*) a disconnection order to the trigger circuit 12, which is none other than a multivibrator of the bistable type.

The marking selector 50 assigned to the register 30 sends a marking impulse to the inlet *m* of the corresponding interconnection network 140.

In the network 140, the marking impulse lights the diodes of the free half-paths related to its inlet *m*, which diodes then operate at a reduced output, and cause the diodes of the half-path input-*m*-output-*p* to pass from the normal output condition to the strong output condition.

In addition, the trigger circuit 12 which is in the operated position, starts the associated device 173 called the disconnection impulse distributor, which sends simultaneously to the thousand intermediate equipments an impulse of a duration of one microsecond called a disconnection impulse. This impulse is transmitted with a delay of the order of one hundred microseconds in order to permit a stabilization, following passage from the normal output condition to the strong output condition.

The intermediate equipment $16_p$ to which is now presented the coincidence (*a*) a disconnection impulse, and (*b*) a strong output at the outlet *p* of the interconnection network involved, returns to its state of rest, which has for effect to return the trigger circuit 12 also to the state of rest, by means of the "or" gate 174.

The "or" gate 174, like the "or" gate 172, has one thousand inlets. One inlet of this gate is assigned to each intermediate equipment $16_0$ to $16_{999}$.

The intermediate equipment unit $16_p$ being at rest, the half-path input-*m*-outlet-*p* of the interconnection network 140 passes from the strong output condition to the reduced output condition; while the half-path of unknown identity which was in the condition of normal output is extinguished, from the fact that no marking is effected by the corresponding selector.

At the end of the marking impulse sent by the selector, the diodes of the half-paths which are in the reduced output condition are extinguished. The disconnection between the telephone line $L_m$ and the line of unknown identity is then complete.

Figure 3:
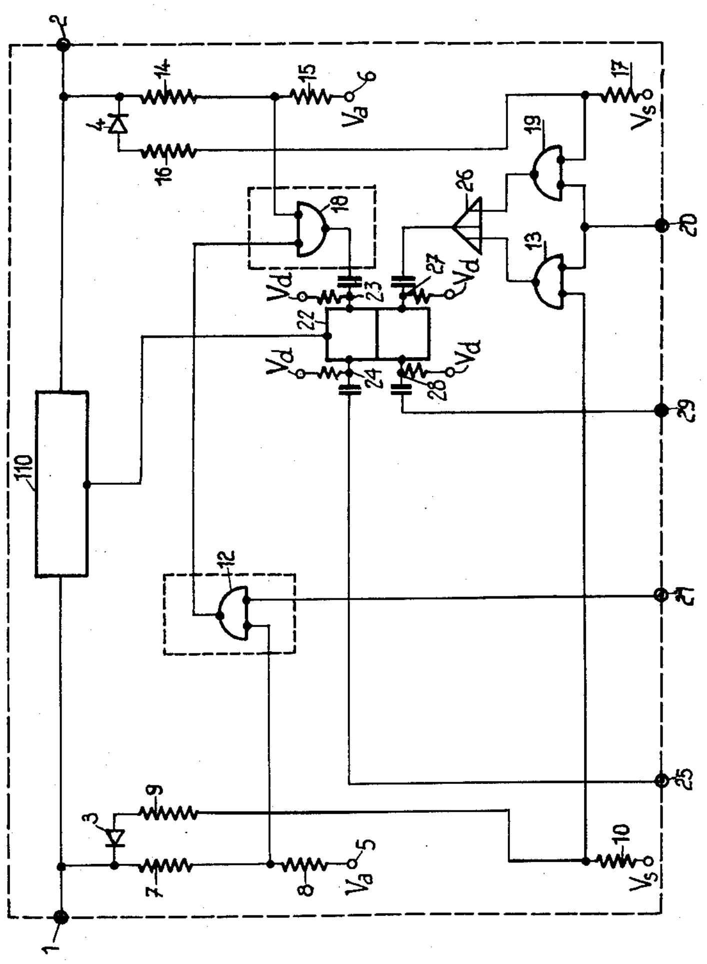
FIG. 3 is an operating schematic of an intermediate equipment unit.
Figure 4:
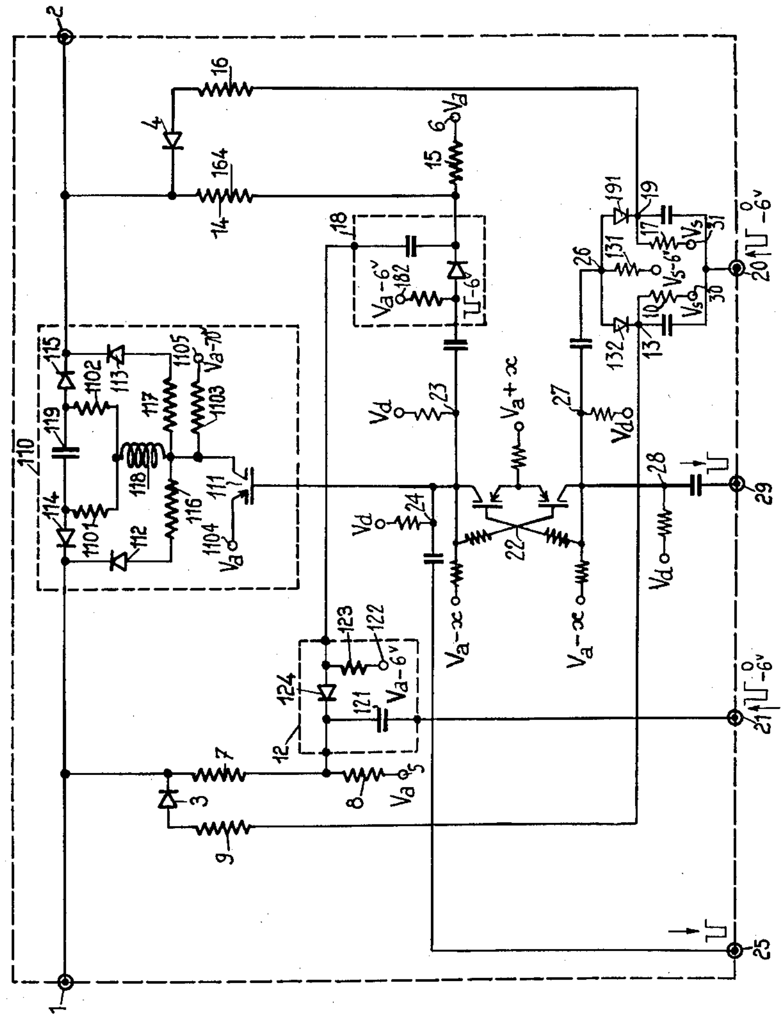
FIG. 4 is a practical construction schematic of the intermediate equipment shown in FIG. 3.

FIGS. 3 and 4 give respectively the schematic layout and the actual construction of one of the intermediate equipments $16_0$ to $16_{999}$ which are all identical. The indications of potential which are included therein for the clearness of the description have no limitative character, and should be taken by way of example only. Each outlet of the interconnection network 140 terminates at the inlet 1 the corresponding intermediate equipment unit. Each outlet of the same rank of the network 150 terminates at the inlet 2 of the same intermediate equipment unit. Thus the outlet *p* of the network 140 terminates at the inlet 1 of the intermediate equipment unit $16_p$, and the outlet *p* of the network 150 terminates at the inlet 2 of the same equipment unit $16_p$.

At rest, the diodes 3 and 4 are blocked, the points 5 and 6 are at a potential $V_a$ (for example 400 volts), the points 30 and 31 are at a potential $V_s$ (for example 300 volts). The potentials $V_a$ and $V_s$ are such that there is a lighting of the gas diodes connected to the inlets 1 and 2 at the time of a marking operation.

During the time (one millisecond) that a marking impulse of −50 volts is applied to an inlet *m* of the interconnection network 140, each of the half-paths originating at this point encounters, at the inlet 1 of the corresponding intermediate equipment unit, a high impedance circuit comprising two circuits in parallel: (*a*) point 5 (potential $V_a$=400 volts), resistance 8, resistance 7, point 1; and (*b*) point 30 (potential $V_s$=300 volts), resistance 10, resistance 9, diode 3, point 1. The gas diodes 141, 142, 143 of all of these half-paths are lighted in the reduced output condition.

In all of the involved intermediate equipments, the drop of potential in the resistance 8 unblocks the "and" gate 12, and the drop of potential in the resistance 10 unblocks the "and" gate 13.

The marking impulse applied simultaneously to an inlet *n* of the interconnection network 150 provokes, in the same manner, the lighting at reduced output of all of the free half-paths originating at this point, through the inlets 2 of the corresponding intermediate equipments and the following circuits in parallel: (*c*) point 6 ($V_a$=400 volts), resistance 15, resistance 14, point 2; and (*d*) point 31 ($V_s$=300 volts), resistance 17, resistance 16, diode 4, point 2. In all of the intermediate equipments involved, the voltage drop in the resistance 15 unblocks the "and" gate 18, and the voltage drop in the resistance 17 unblocks the "and" gate 19.

A certain number of intermediate equipments thus find themselves connected on the one hand to the line $L_m$ through the interconnection network 140, and on the other hand to the line $L_n$ through the interconnection network 150. During the connection operation, the disconnection impulse distributor 173 does not transmit any impulse to their terminals 20, and consequently, their gates 13 and 19 do not transmit any signal, although the connection impulse distributor starts. Let $16_p$ be the first of the intermediate equipments thus connected to *m* and *n* to receive a connection on its terminal 21.

This negative impulse (−6 volts) passes, as will be seen later, through the "and" gates 12 and 18 connected in series, which has for effect the switching of the trigger circuit 22 to its working position, by means of the discriminating network 23 comprising a condenser and a resistance connected to an appropriate source of potential $V_d$. Switching the trigger circuit 22 to its operating position unblocks the network 110, as will be explained subsequently, and the latter permits the establishment of the condition of strong outputs. The trigger circuit 22 emits a signal on assuming the operated position. This signal, picked up by the discriminating network 24 similar to the network 23, and transmitted via the terminal 25 to one of the thousand inlets of the "or" gate 172 (FIG. 1), stops the connection impulse distributor 171.

The operation of the gate 12 is as follows. When a reduced current condition is established in a half-path terminating at the inlet 1 of the intermediate equipment $16_p$, a drop of potential $V_c$ results, through the resistance 8, which is at least equal to 6 volts. To mitigate the variations of $V_c$ imputable to the gas diodes, the potential of the point 122 and the value of the resistance 123, low with respect to that of the resistance 8, are chosen in such a way as to limit $V_c$ to 6 volts. Under the variation of the voltage $V_c$ at its terminals, the condenser 121 is charged. When a connection impulse of −6 volts arrives at the terminal 21, the condenser 121 discharges through the resistance 123 and the external circuit, that is to say the input of the gate 18.

The diode 124 of the gate 12 has a double role: (1) it permits the establishment of a threshold of regulation for the reduced current operation of the gas diodes; and (2) it blocks the impulse arriving at the terminal 21 when the condenser 121 has not been previously charged.

In this manner, if the condenser charge lasts for example, 100 microseconds, and if in addition, the impulse arriving at the terminal 21 lasts one microsecond, it is thus possible to benefit by a gain in current of the order of one hundred fold.

The gate 18 is analogous to the gate 12.

The trigger circuit 22 has no special characteristics. It is a transistor trigger circuit of known type connected to a potential $V_a+x$ on the emitter side, and to a potential $V_a-x$ on the collector side.

Some details will now be given on the role and the operation of the network 110.

At rest, the transistor 111 being blocked, the diodes 112, 113, 114, 115 are blocked. At the start of a connection operation, the transistor 111 and the diodes 112, 113, 114, 115 remain blocked, which has for effect to make the inlets 1 and 2 of the intermediate equipment independent.

When the trigger circuit 22 assumes its working position, the transistor 111 whose base is in relation with the trigger circuit 22 becomes passing. The diodes 112 and 113 are unblocked and let a part of the current issuing from the point 1104 pass into each of the resistances 116 and 117. This fraction of current permits keeping the half-paths lighted, even when there is no marking. The diodes 114 and 115 are unblocked next, after a certain delay whose value depends on the inductance 118 and the capacitance 119, and strong out-put currents are established in each of the half-paths, particularly through the resistances 1101 and 1102, if the marking impulse at normal output is still present, as soon as the latter has terminated. Under these conditions, the potentials of the inlets 1 and 2 of the intermediate equipment are established at a value $V_s$ of approximately 300 volts.

During a conversation between two subscribers, the alternating voice-frequency currents pass through the condenser 119, and cannot circulate in the other parts of the network 110, because of the presence of the inductance 118, and the high value of the resistances 116 and 117.

The resistance 1103 limits the current passing from the point 1104 at potential $V_a$ to the point 1105 whose potential is inferior by at least 50 volts, or in the order of 230 volts.

Starting from the moment where the connection operation is effected, the connection impulses arriving from the distributor 171 at the terminal 21 and transmitted by the "and" gates 12 and 18 to the trigger circuit 22, do no more than confirm the latter in its operating position. The inlets 1 and 2 having taken a potential $V_s$ equal to that which is applied to the points 30 and 31, the resistances 9, 10, 16 and 17 are traversed by no current. The gates 13 and 19 are therefore blocked, and the disconnection impulses arriving at the terminal 20 do not reach the trigger circuit 22.

When a disconnection operation is effected, and if we suppose that the marked half-path terminates at the terminal 1, the marking potential, such as −50 volts, is added algebraically to the previous potential of the point 1, which passes to 250 volts. A current is established in the resistances 10 and 9, and the half-path involved shifts to the high output condition, on the one hand by way of the resistance 116 and the diode 112, and on the other hand, with a certain delay, by way of the inductance 118, the resistance 1101, and the diode 114. A blocking polarization is thus applied to the diode 115 through the resistance 1102, and the output on the side not marked falls to the fraction of the normal output which passes through the resistance 117. Furthermore, current passes through the resistance 10 as well as through the resistance 8, and the gate 13 is open, as are the gates 12 and 18. Since there is no connection impulse on the terminal 21 during a disconnection operation, no signal passes through the gate 18. On the other hand, the disconnection impulse arriving at the terminal 20 passes through the gate 13 and the "or" gate 26, and returns the trigger circuit 22 to its position of rest by means of the discriminating network 27.

When the trigger circuit returns to the position of rest, the transistor 111 becomes blocked, as well as the diodes 112, 113, 114. The result of this is that the "non-marked" side is extinguished, and that the "marked" side passes to the reduced output condition by the intermediary of the resistances 7, 8 and 9, 10. At the end of the marking, the said marked side is extinguished.

The differentiation of the signal emitted by the trigger circuit 22, by the discriminating network 28, gives an impulse at the terminal 29, which is in relation with the "or" gate 174 (FIG. 1) which stops the disconnection impulse distributor 173.

The gates 13 and 19 are likwise analogous to the gate 12, but the resistances homologous to the resistance 123 of the gate 12 are replaced by the common resistance 131. The regulation of the two gates 13 and 19 is effected by the intermediary of the common resistance 131.

The diodes 132 and 191, like the diode 124, have the double role mentioned above. In addition, these same diodes constitute, with the resistance 131, the "or" gate 26.

To conclude, certain details will now be given concerning the annexed devices 17 (FIG. 1).

The "or" gate 172 which controls the connection operation and the "or" gate 174 which controls the disconnection operation have no special features; they are of a standard type.

The disconnection impulse distributor 173 (FIG. 1) comprises two multivibrators of the monostable type, connected in cascade. As has been previously stated, the disconnection impulse distributor 173 delivers an impulse of one microsecond duration, one hundred microseconds after the initiation of a disconnection operation.

The connection impulse distributor 171 is shown partly in FIG. 5. This figure represents, in effect, a connection impulse distributor for scanning one hundred intermediate equipments in the course of a connection operation. The path testing device taken as an example in the present discolsure having been equipped for one thousand subscriber lines, it will be supposed that the connection impulse distributor 171 is composed of ten equipment units analogous to that of FIG. 5 and capable of being utilized separately or by groups of two to five.

The connection impulse distributor 171 is made active by the passage of the trigger circuit 11 to its working position as the result of a connection order issued by the universal computer 20 (FIG. 1). Its operation is stopped by the return of the trigger circuit 11 to its position of rest as the result of the operation of an intermediate equipment $16_0$ to $16_{999}$.

The connection impulses, of a duration of one microsecond, are delivered every two microseconds by a monostable multivibrator *h* to the one of the hundred output terminals $S_0$ to $S_{99}$ whose number is set up on the seven bistable multivibrators *a* to *g* corresponding to the seven digits of the numbers 0 to 100 when translated into the binary notation. The hundred outlets $S_0$ to $S_{99}$ are respectively connected to the terminals 21 (FIG. 3) of one hundred intermediate equipments. The seven bistable multivibrators *a* to *g* are arranged in the form of a counter. The bistable multivibrator *a*, which corresponds to the digit of the lowest order, receives an impulse which increases by one unit the number set up every two microseconds, these impulses being offset by one microsecond with respect to those of the monostable multivibrator *h*.

The network A is a diode decoder having six inlets respectively connected to the outlets $a_0$, $a_1$, $b_0$, $b_1$, $c_0$, $c_1$ of the three bistable multivibrators *a*, *b*, *c*. It comprises eight diode type "and" gates having three inlets (represented in FIG. 5 by the three small circles located on a same horizontal line) and eight outlets $A_0$ to $A_7$. It gives an unblocking signal (positive in the case of FIG. 5) over that one of its outlets $A_0$ to $A_7$ whose number is set up by the multivibrators *a*, *b*, and *c* on the corresponding horizontal line of the matrix network A′, which will be described hereinafter.

The network C, of a construction analogous to that of the network A, comprises four diode type "and" gates having three inlets, of which two are under the control of the bistable multivibrators *f* and *g*, and the third under the control of the trigger circuit 11. It gives an unblocking signal over that one of its four outlets $C_0$ to $C_3$ whose number is set up by the bistable multivibrators *f* and *g*. provided that the trigger circuit 11 is in its operated position. This unblocking signal, amplified and inverted in the network C′, is applied on the corresponding vertical line of the matrix network B′ analogous to A′. The construction of the networks A′, B′ and C′ will be described later.

The network B, similar to the network C, transmits the connection impulse issued from the monostable multivibrator *h* to the one of its four outlets $B_0$ to $B_3$ whose number is set up by the multivibrators *d* and *e*. This connection impulse passes into the matrix network B′ by the point of intersection between the horizontal line corresponding to the outlets $B_0$ to $B_3$ under consideration and the vertical line unblocked by the signal issued from the network C, and also into the matrix network A′ by the point of intersection between the vertical line where it presents itself and the horizontal line unblocked by the signal issued from the network A. It thus terminates at the outlets $S_0$ to $S_{99}$ whose number is set up by the combination of the seven multivibrators *a* to *g*.

The network A′ is a matrix network comprising eight horizontal lines and sixteen vertical lines, or 128 coincidence points at the points of intersection of the lines. The "and" gates located at these points of intersection and schematized by a losenge are transistor gates which, contrary to the standard "and" gates, consume current only during the time of a coincidence.

The network B′ is a matrix network constructed in the same manner as the network A′, but having only four horizontal lines and four vertical lines, and therefore sixteen points of intersetcion, or one for each vertical line of the network A′.

One of the transistor "and" gates of one of the networks A′ or B′ is represented schematically in FIG. 6, and will be taken to be, by way of example, the transistor gate $A'_{37}$ which is found at the junction point between the horizontal line No. 3 and the vertical terminal No. 7 of the network A′. As is shown in FIG. 5, the inlet 1 of the gate $A'_{37}$ controlled by the outlet $A_3$ of the diode type decoder A, conducts at the base of the n-p-n transistor 2, which requires only a weak current; while the inlet 3 of the gate $A'_{37}$ controlled by the outlet $B'_7$ of the matrix network B′, conducts to the emiter of the transistor 2, which requires a current of rather high intensity. In the absence of a coincidence at the diode "and" gate of the line $A_3$ of the diode decoder A, the "base" potential of the transistor 2 is negative. The n-p-n transistor 2 is blocked, as well as the diode 6. The output potential on the terminal 10 has a value +E.

If on the contrary, the line 3 corresponds to the position of the trigger circuits *a*, *b*, and *c*, a positive potential $V_1/2+V_0$ limited to $V_1/2$ by the diode 6 is applied to the base of the transistor 2.

The voltages of the network B′ being offset with respect to those of the network A′ by $-(+E-V_1)$, the gate $B'_7$ applies a potential equal to $V_1$ to the inlet 3 of $A'_{37}$ when it is at rest, and to a null potential when it is the site of a coincidence. If the column $A'_7$ is not selected, the transistor 2 therefore remains blocked, whereas if the gate $B'_7$ applies a potential equal to zero to the inlet 3 of $A'_{37}$, the "emitter" voltage of the transistor 2 is substantially equal to $+V_1/2$ (neglecting the direct base-collector voltage). The emitter current, function of the resistance 7, is independent of the gain of the transistor 2.

It is necessary however, that the current arriving at the inlet 1 be superior to the base current required for the transistor 2, having the minimum permissible gain, to produce the emitter current defined above; otherwise stated, it is always necessary that current pass through the diode 6.

The resistance 8 lets pass only a small fraction of the collector current, the remainder of which is divided between the load connected to the outlet 10, and the diode 9.

The circuit should be arranged so that even with the smallest external load connected to the outlet 10, some current still passes through the diode 9. Under these conditions, the output signal on the terminal 10 is regulated for voltage and has an amplitude $V_1$.

It should be noted that it is to standardize the circuits that the collector and emitter signals given by the transistor 2 have the same amplitude, this equality not being imperative otherwise.

The transistor "and" circuit which has just been described is utilized as a two-inlet coincidence gate in the networks A′ and B′. It is also used as a phase inverter-amplifier in the network C′, but in this last application, the inlet terminal 3 is permanently connected to ground. The outlets 10 of the network C′ attack the inlet 3 of the network B′, just as the outlets 10 of the network B′ attack the inlets 3 of the network A′ (FIG. 5). The voltages applied to the network C′ (FIG. 5) are therefore like-wise offset by $-(+E-V_1)$ with respect to those utilized in the network B′ (FIG. 5).

It should be noted further that the emitter currents increase when we pass from the network A′ to the networks B′ and C′; the resistances 7 should therefore be reduced in the same proportion.

The utilization of the circuit of FIG. 6 permits reducing the consumption of current by the connection impulse distributor 171 while at rest; this consumption is in fact produced only by the bistable trigger circuits *a* to *g* and the diode networks A, B, and C.

During the emission of a connection impulse on one of the hundred outlets of distributor 171 (FIG. 1) connected to a terminal 21 (FIG. 3), only three transistors are taking current: one in each of the networks A′, B′, C′.

What is claimed is:

1. In a switching arrangement for establishing a plurality of communication paths, in which said arrangement has first and second sets of input terminals, first and second interconnection switching networks, and a plurality of intermediate equipment units, each of said interconnection networks comprising bistable diode crosspoint switching devices arranged in stages between the corresponding input terminals and the intermediate equipment units, so as to define paths between each terminal of the first set and each terminal of the second set of input terminals, each said path including one of said intermediate equipment units connected between crosspoint devices of the first network and crosspoint devices of the second network:

The combination in each said intermediate equipment unit comprising gate means having a first gate terminal coupled to the first interconnection network, a second gate terminal coupled to the second interconnection network, a connection-impulse terminal, and an output terminal coupled to a bistable trigger device, a first capacitor connected between the impulse-connection terminal and the first gate terminal, a first diode and a second capacitor connected in series between the first gate terminal and the second gate terminal, a second diode connected between the second gate terminal and the output terminal, means for reverse biasing each of said diodes, means for selectively applying marking impulses through the first interconnection network to said first gate terminal and through said second interconnection network to the second gate terminal, means for applying connection impulses to said connection-impulse terminal, the connection impulses being of a polarity which opposes said reverse bias potential but of a voltage amplitude less than the value of the bias potential across each diode, so that the connection impulses are normally blocked by the gate means, means responsive to a marking impulse from either of the interconnection networks for charging the corresponding capacitor coupled thereto, so that in an intermediate equipment unit receiving marking impulses through both of said interconnection networks to thereby charge both of said capacitors, in response to a connection impulse to the connection-impulse terminal the first capacitor discharges through the first diode to supply an impulse through the second capacitor which discharges through the second diode to thereby supply a signal from the output terminal to said bistable trigger device, to thereby cause a communication path to be established and held.

2. In a switching arrangement, the combination as claimed in claim 1, wherein each of said intermediate equipment units further includes gating means comprising third and fourth gate terminals coupled to the first and second interconnection networks respectively, a disconnection-impulse terminal, and a second output terminal coupled to said bistable trigger device, third and fourth capacitors coupled respectively between said third and fourth gate input terminals and said disconnection-impulse terminal, third and fourth diodes coupled respectively between said third and fourth gate input terminals and said second output terminal, means for reverse biasing said third and fourth diodes to normally block impulses applied to said disconnection-impulse terminal, means responsive to a marking impulse from either of the interconnection networks for charging the corresponding third or fourth capacitor coupled thereto, and means responsive to a disconnection impulse at the disconnection-impulse terminal with either said third or fourth capacitor charged to cause that capacitor to discharge through the corresponding diode to the second output terminal to thereby reset said bistable trigger device to thereby cause the said communication path to be released.

3. In a switching arrangement, the combination as claimed in claim 2, further including an impulse distributor for applying impulses successively to the connection-impulse terminals of the said intermediate equipment units, and means responsive to the setting of the bistable trigger device in one of the intermediate equipment units in response to the signal from the first said output terminal for supplying a signal to stop said impulse distributor and to indicate that the connection has been established.

4. In a switching arrangement, the combination as claimed in claim 3, further including a disconnection impulse distributor for applying disconnection impulses successively to the disconnection-impulse terminals of said intermediate equipment units, and means responsive to the resetting of the bistable device in one of said intermediate equipment units in response to the signal from said second output terminal to stop said disconnection impulse distributor and to indicate that the connection has been released.

5. In a switching arrangement, the combination as claimed in claim 2, wherein said bistable trigger circuit comprises two transistors with a cross coupling arrangement.

References Cited in the file of this patent

UNITED STATES PATENTS

| | | |
|---|---|---|
| 2,769,865 | Faulkner | Nov. 6, 1956 |
| 2,867,734 | Steed | Jan. 6, 1959 |
| 2,883,470 | Jacoby et al. | Apr. 21, 1959 |
| 2,898,406 | Davison et al. | Aug. 4, 1959 |